(12) United States Patent
Choi et al.

(10) Patent No.: US 9,718,959 B2
(45) Date of Patent: Aug. 1, 2017

(54) ALIPHATIC POLYCARBONATE-POLYURETHANE COMPOSITION AND ALIPHATIC POLYCARBONATE-POLYURETHANE RESIN

(71) Applicants: SK Innovation Co., Ltd., Seoul (KR); SK Global Chemical Co., Ltd., Seoul (KR)

(72) Inventors: Ji Yeon Choi, Daejeon (KR); Jae Young Park, Daejeon (KR); Seung Gweon Hong, Daejeon (KR); Tae Wook Kwon, Daejeon (KR); Kwang Jin Chung, Daejeon (KR)

(73) Assignees: SK Innovation Co., Ltd., Seoul (KR); SK Global Chemical Co., Ltd., Seoul (KR)

( * ) Notice: Subject to any disclaimer, the term of this patent is extended or adjusted under 35 U.S.C. 154(b) by 14 days.

(21) Appl. No.: 14/565,856

(22) Filed: Dec. 10, 2014

(65) Prior Publication Data

US 2015/0166790 A1 Jun. 18, 2015

(30) Foreign Application Priority Data

Dec. 11, 2013 (KR) .................. 10-2013-0153776
Dec. 5, 2014 (KR) .................. 10-2014-0173529

(51) Int. Cl.
| | | |
|---|---|---|
| *C08G 64/02* | (2006.01) | |
| *C08G 64/34* | (2006.01) | |
| *C08G 71/04* | (2006.01) | |
| *C08L 69/00* | (2006.01) | |
| *C08L 75/04* | (2006.01) | |

(52) U.S. Cl.
CPC .............. *C08L 75/04* (2013.01); *C08G 64/34* (2013.01); *C08G 71/04* (2013.01); *C08L 69/00* (2013.01); *C08G 2270/00* (2013.01); *C08L 2205/00* (2013.01)

(58) Field of Classification Search
CPC .......... C08L 75/04; C08L 69/00; C08G 71/04
See application file for complete search history.

(56) References Cited

U.S. PATENT DOCUMENTS

| | | | |
|---|---|---|---|
| 4,912,149 A | 3/1990 | Robeson et al. | |
| 4,946,884 A | 8/1990 | Kuphal et al. | |
| 4,950,696 A * | 8/1990 | Palazotto | C08F 2/50 430/280.1 |
| 2011/0309539 A1* | 12/2011 | Steinke | C08L 69/00 264/5 |
| 2012/0059078 A1* | 3/2012 | Kim | C08J 9/103 521/189 |
| 2012/0196958 A1* | 8/2012 | Park | C08G 18/4208 524/14 |

FOREIGN PATENT DOCUMENTS

| | | | | |
|---|---|---|---|---|
| CN | 101857718 A | * | 10/2010 | |
| CN | WO 2010115567 A1 | * | 10/2010 | ............. C08G 18/12 |
| EP | 0125739 A1 | | 11/1984 | |
| EP | 2845878 A2 | | 3/2015 | |
| FR | 2389661 A1 | | 12/1978 | |
| GB | 1365015 A | * | 8/1974 | ............. C08G 18/003 |
| WO | WO 2006103213 A1 | * | 10/2006 | ............. C08G 64/183 |

OTHER PUBLICATIONS

Chen et al., "Complexes and IPN of CO2 Copolymers," Polymers for Advanced Technologies, vol. 12, pp. 687-692 (2001).*
Shyu et al., "Polycarbonate-Polyurethane Semi-Interpentrating Polymer Networks: Tg Behaviour and Morphology," Journal of Applied Science, vol. 43, pp. 2151-2162 (1987).*

* cited by examiner

*Primary Examiner* — Randy Gulakowski
*Assistant Examiner* — Ha S Nguyen
(74) *Attorney, Agent, or Firm* — The Webb Law Firm

(57) ABSTRACT

Provided are an aliphatic polycarbonate-polyurethane composition and an aliphatic polycarbonate-polyurethane polymer using the same.

12 Claims, No Drawings

ALIPHATIC POLYCARBONATE-POLYURETHANE COMPOSITION AND ALIPHATIC POLYCARBONATE-POLYURETHANE RESIN

CROSS-REFERENCE TO RELATED APPLICATIONS

This application claims priority to Korean Patent Application No. 10-2013-0153776, filed Dec. 11, 2013, and No. 10-2014-0173529, filed Dec. 5, 2014, the disclosures of which are hereby incorporated in their entirety by reference.

TECHNICAL FIELD

The following disclosure relates to an aliphatic polycarbonate-polyurethane composition and an aliphatic polycarbonate-polyurethane polymer using the same.

BACKGROUND

Recently, industrialization of aliphatic polycarbonate is proceeding as a method for reducing generation of carbon dioxide, for preparing measures against global warming. Aliphatic polycarbonate which is a rubbery plastic having a soft texture, has excellent processability, and is easily controllable in terms of its degradation property, and thus, has been much researched as a biodegradable polymer. However, since the aliphatic polycarbonate has a low glass transition temperature ($T_g$), and is easily degradable around 200° C., it is characterized by having weak thermal resistance. Further, it has a low modulus of elasticity as the mechanical physical properties, and a thin film product prepared therefrom has a brittle property, so that it has a limitation in use in various fields. Thus, a technique to raise a glass transition temperature or thermal resistance, or to improve mechanical strength through a blend with various resins, is demanded. For example, U.S. Pat. No. 4,946,884 discloses a resin composition produced by melt-kneading polypropylene carbonate with polymethyl methacrylate (PMMA) or including a binder for molding process of ceramics or metal powder, and U.S. Pat. No. 4,912,149 discloses improvement of a mechanical property by melt-kneading polyvinyl chloride acetate. However, since these inventions have limitation in an improvement of mechanical physical properties only by a blend with a different kind of resin, a structural improvement is needed.

RELATED ART DOCUMENT

Patent Document (Patent Document 1) U.S. Pat. No. 4,946,884.
(Patent Document 2) U.S. Pat. No. 4,912,149.

SUMMARY

An embodiment of the present invention is directed to providing various application methods of an aliphatic polycarbonate resin.

More particularly, an embodiment of the present invention is directed to providing an aliphatic polycarbonate-polyurethane composition usable in various application fields by mixing an aliphatic polycarbonate resin and polyurethane, and an aliphatic polycarbonate-polyurethane polymer prepared therefrom.

In one general aspect, an aliphatic polycarbonate-polyurethane polymer includes aliphatic polycarbonate (A) produced by reacting carbon dioxide with one or two or more different epoxide compounds selected from the group consisting of (C2-C20)alkylene oxide unsubstituted or substituted with halogen, (C1-C20)alkyloxy, (C6-C20)aryloxy or (C6-C20)ar(C1-C20)alkyl(aralkyl)oxy; (C4-C20)cycloalkylene oxide unsubstituted or substituted with halogen, (C1-C20)alkyloxy, (C6-C20)aryloxy or (C6-C20)ar(C1-C20)alkyl(aralkyl)oxy; and (C8-C20)styrene oxide unsubstituted or substituted with halogen, (C1-C20)alkyloxy, (C6-C20)aryloxy, (C6-C20)ar(C1-C20)alkyl(aralkyl)oxy or (C1-C20)alkyl, and polyurethane (B).

In another general aspect, an aliphatic polycarbonate-polyurethane composition includes aliphatic polycarbonate (A) produced by reacting carbon dioxide with one or two or more different epoxide compounds selected from the group consisting of (C2-C20)alkylene oxide unsubstituted or substituted with halogen, (C1-C20)alkyloxy, (C6-C20)aryloxy or (C6-C20)ar(C1-C20)alkyl(aralkyl)oxy; (C4-C20)cycloalkylene oxide unsubstituted or substituted with halogen, (C1-C20)alkyloxy, (C6-C20)aryloxy or (C6-C20)ar(C1-C20)alkyl(aralkyl)oxy; and (C8-C20)styrene oxide unsubstituted or substituted with halogen, (C1-C20)alkyloxy, (C6-C20)aryloxy, (C6-C20)ar(C1-C20)alkyl(aralkyl)oxy or (C1-C20)alkyl, and polyurethane (B).

Other features and aspects will be apparent from the following detailed description, and the claims.

DETAILED DESCRIPTION OF EMBODIMENTS

Hereinafter, exemplary embodiments will be described in detail.

The present applicant has found that using chemically or physically mixed aliphatic polycarbonate resin and polyurethane may lead to a dramatic improvement of flex resistance, tensile strength, mechanical strength such as elongation, elasticity, and the like, as compared with using aliphatic polycarbonate resin alone, and completed the present invention.

In particular, the present invention was completed by discovering the fact that mechanical physical properties may be much improved by forming an interpenetrating polymer network structure from an aliphatic polycarbonate resin and polyurethane.

One embodiment of the present invention relates to an aliphatic polycarbonate-polyurethane polymer, wherein the aliphatic polycarbonate (A) resin and the polyurethane (B) resin may form a blending, compounding, hybrid, or interpenetrating polymer network (IPN) structure.

The aliphatic polycarbonate (A) may have a weight average molecular weight of 1,000 to 300,000 g/mol.

The weight average molecular weight was measured in the present invention by dissolving a powder sample in THF, then using gel permeation chromatography (GPC; agilent Technologies 1260 infinity) (PLgel mixed B (7.5 mm×300 mm) was used as a column, and polystyrene (Agilent EasyCal) was used as a standard sample).

More specifically, the aliphatic polycarbonate (A) used in the preparation of the aliphatic polycarbonate-polyurethane polymer of the blending, compounding and hybrid structures in the present invention may have a weight average molecular weight of 1,000 to 300,000 g/mol. Further, the aliphatic polycarbonate (A) used in the preparation of the aliphatic polycarbonate-polyurethane polymer of the interpenetrating polymer network (IPN) structure may have a weight average molecular weight of 1,000 to 300,000 g/mol. However, the present invention is not limited thereto.

The polyurethane (B) may have a weight average molecular weight of 10,000 to 1,000,000 g/mol.

The blending and compounding may be carried out through an extruder by melt-kneading the aliphatic polycarbonate (A) resin and the polyurethane (B) resin at 80 to 200° C. In an extrusion process, a simple extrusion to go through a simple melt-kneading step, and a reaction extrusion technique to carry out a crosslinking and a chain extension reaction may be applied. In case of the reaction extrusion, interfacial energy of a surface is lowered to prevent phase separation and form a uniform phase, thereby contributing to an improvement of the physical properties of an "aliphatic polycarbonate-polyurethane composition", and dispersion of an organic/inorganic additive.

The hybrid and interpenetrating polymer network structure mean a network structure formed by including a solvent.

The interpenetrating polymer network structure is a multicomponent polymer, wherein at least one component has a network structure, and at least one component is polymerized or crosslinked in the presence of another component, thereby generating interpenetrating between polymer chains. Since a chain degree of the polymer is high due to the network structure, phase separation which often occurs in a polymer blend is inhibited, and improvement of various physical properties may be expected by having dual phase continuity wherein two components form a continuous phase.

In order to form the interpenetrating polymer network structure, the aliphatic polycarbonate (A) resin, a urethane prepolymer produced by reacting polyol and an isocyanate compound, and a curing agent may be reacted to prepare the aliphatic polycarbonate-polyurethane polymer.

Alternatively, in order to form the interpenetrating polymer network structure, aliphatic polycarbonate, a polyol compound, and 0.9 to 1.2 times equivalent of a curing agent to the hydroxyl group equivalent of the polyol compound are dissolved in a solvent such as methyl ethyl ketone (MEK), then allowed to react at 80° C. for a period of time, or subjected to reactive extrusion at 120 to 200° C.

Alternatively, aliphatic polycarbonate and an epoxy compound may be dissolved in a solvent, and then a curing agent may be equivalently added thereto, thereby forming a network structure, or an aliphatic polycarbonate, an epoxy compound, and a curing agent may be subjected to reactive extrusion at 120 to 220° C.

Alternatively, aliphatic polycarbonate and an acrylic compound may be dissolved in a solvent, and a reactive initiator or a catalyst may be equivalently added thereto, thereby forming a polymer network structure, or aliphatic polycarbonate, an acryl compound, and an initiator or a catalyst may be subjected to reactive extrusion at 120 to 200° C.

The aliphatic polycarbonate-polyurethane polymer may include 5 to 95% by weight of the aliphatic polycarbonate (A), and 5 to 95% by weight of the polyurethane (B), based on the total weight of the polymer. More specifically, the polymer may include 20 to 80% by weight of the aliphatic polycarbonate (A), and 20 to 80% by weight of the polyurethane (B). The physical properties to be desired may be satisfied in the above range.

Further, another embodiment of the present invention relates to an aliphatic polycarbonate-polyurethane composition including aliphatic polycarbonate (A) and polyurethane (B) for preparing an aliphatic polycarbonate-polyurethane polymer.

The first embodiment of the aliphatic polycarbonate-polyurethane composition of the present invention may be a composition wherein the aliphatic polycarbonate (A) resin and the polyurethane (B) resin are blended or compounded.

Further, the second embodiment of the aliphatic polycarbonate-polyurethane composition of the present invention may be a composition wherein the aliphatic polycarbonate (A) and the polyurethane (B) resin form a hybrid or interpenetrating polymer network structure, together with a solvent capable of dissolving these resins. As the solvent, any one selected from the group consisting of a ketone-based, an acetate-based, and an ether-based solvents, or a mixture of two or more thereof may be used, but not limited thereto.

Herein, a solid content of the aliphatic polycarbonate-polyurethane composition may be 30 to 50% by weight, and varied with the use of the molded article to be manufactured, or the manufacturing method thereof.

In case of the first and the second embodiments of the aliphatic polycarbonate-polyurethane composition of the present invention, the aliphatic polycarbonate (A) may have a weight average molecular weight of 1,000 to 300,000 g/mol, and the polyurethane (B) may have a weight average molecular weight of 10,000 to 1,000,000 g/mol, but not limited thereto. The composition may be applied to various fields in the above range.

Further, the polycarbonate-polyurethane composition may include 5 to 95% by weight of the aliphatic polycarbonate (A), and 5 to 95% by weight of the polyurethane (B), based on the total weight of the composition. The composition may have an effect of excellent mechanical physical properties in the above content range.

Further, the third embodiment of the aliphatic polycarbonate-polyurethane composition of the present invention may be a composition wherein the aliphatic polycarbonate (A) resin, a urethane prepolymer produced by reacting polyol and an isocyanate compound, and a curing agent are included.

Further, the fourth embodiment of the aliphatic polycarbonate-polyurethane composition of the present invention may be a composition wherein the aliphatic polycarbonate (A) resin, polyol, and a curing agent are included.

Further, the fifth embodiment of the aliphatic polycarbonate-polyurethane composition of the present invention may be a composition wherein any one selected from the group consisting of an epoxy compound and an acryl compound, or a mixture thereof are further included in the compositions of the third and the fourth embodiments.

Further, the sixth embodiment of the aliphatic polycarbonate-polyurethane composition of the present invention may be a composition wherein a solvent is further included in the compositions of the third, the fourth, and the fifth embodiments.

Further, the seventh embodiment of the aliphatic polycarbonate-polyurethane composition of the present invention may be a composition wherein an initiator or a catalyst is further included, in the compositions of the third, the fourth, and the fifth embodiments.

Hereinafter, each component used in the aliphatic polycarbonate-polyurethane polymer and the aliphatic polycarbonate-polyurethane composition will be described in more detail.

The aliphatic polycarbonate (A) of the present invention may be produced by a copolymerization reaction of carbon dioxide with one or two or more different epoxide compounds selected from the group consisting of (C2-C20) alkylene oxide unsubstituted or substituted with halogen, (C1-C20)alkyloxy, (C6-C20)aryloxy or (C6-C20)ar(C1-

C20)alkyl(aralkyl)oxy; (C4-C20)cycloalkylene oxide unsubstituted or substituted with halogen, (C1-C20)alkyloxy, (C6-C20)aryloxy or (C6-C20)ar(C1-C20)alkyl (aralkyl)oxy; and (C8-C20)styrene oxide unsubstituted or substituted with halogen, (C1-C20)alkyloxy, (C6-C20)aryloxy, (C6-C20)ar(C1-C20)alkyl(aralkyl)oxy or (C1-C20) alkyl.

Herein, the epoxide compound may be one or two or more selected from the group consisting of ethylene oxide, propylene oxide, butene oxide, pentene oxide, hexene oxide, octene oxide, decene oxide, dodecene oxide, tetradecene oxide, hexadecene oxide, octadecene oxide, butadiene monoxide, 1,2-epoxide-7-octene, epifluorohydrin, epichlorohydrin, epibromohydrin, glycidyl methyl ether, glycidyl ethyl ether, glycidyl n-propyl ether, glycidyl sec-butyl ether, glycidyl n- or isopentyl ether, glycidyl n-hexyl ether, glycidyl n-heptyl ether, glycidyl n-octyl or 2-ethyl-hexyl ether, glycidyl n- or isononyl ether, glycidyl n-decyl ether, glycidyl n-dodecyl ether, glycidyl n-tetradecyl ether, glycidyl n-hexadecyl ether, glycidyl n-octadecyl ether, glycidyl n-icosyl ether, isopropyl glycidyl ether, butyl glycidyl ether, t-butyl glycidyl ether, 2-ethylhexyl glycidyl ether, allyl glycidyl ether, cyclopentene oxide, cyclohexene oxide, cyclooctene oxide, cyclododecene oxide, α-pinene oxide, 2,3-epoxide norbornene, limonene oxide, dieldrin, 2,3-epoxide propyl benzene, styrene oxide, phenyl propylene oxide, stilbene oxide, chlorostilbene oxide, dichlorostilbene oxide, 1,2-epoxy-3-phenoxypropane, benzyloxymethyl oxirane, glycidyl-methylphenyl ether, chlorophenyl-2,3-epoxide propyl ether, epoxypropyl methoxyphenyl ether, biphenyl glycidyl ether, glycidyl naphthyl ether, glycidyl acetic acid ester, glycidyl propionate, glycidyl butanoate, glycidyl n-pentanoate, glycidyl n-hexanoate, glycidyl heptanoate, glycidyl n-octanoate, glycidyl 2-ethylhexanoate, glycidyl n-nonanoate, glycidyl n-decanoate, glycidyl n-dodecanoate, glycidyl n-tetradecanoate, glycidyl n-hexadecanoate, glycidyl n-octadecanoate, and glycidyl icosanoate.

In one embodiment of the present invention, the aliphatic polycarbonate (A) may be polyalkylene carbonate, wherein the alkylene includes ethylene, propylene, 1-butylene, cyclohexene oxide, alkyl glycidyl ether, n-butyl, and n-octyl, but not limited thereto.

The aliphatic polycarbonate of the present invention may be polypropylene carbonate or polyethylene carbonate.

The aliphatic polycarbonate according to one exemplary embodiment of the present invention is characterized by having a weight average molecular weight (Mw) of 1,000 to 300,000 g/mol, and the range of the weight average molecular weight may be varied with the preparation method and the material to be prepared. Mw of 30,000 to 250,000 g/mol is preferable. Further, the polyalkylene carbonate resin may have a glass transition temperature (Tg) of 20 to 105° C., and a melt index (150° C./5 kg) of 0.01 to 350. The polyalkylene carbonate resin in the above range may be advantageously used in a pelletization process.

The composition for preparing the aliphatic polycarbonate-polyurethane polymer having the interpenetrating polymer network structure according to one exemplary embodiment of the present invention may contain 5 to 950 parts by weight of a polyol compound and 0.9 to 1.2 times equivalent of a curing agent to the hydroxyl group equivalent of the polyol, based on 100 parts by weight of the aliphatic polycarbonate. Departing from the above range, the composition may have remaining unreacted polyisocyanate, or an insufficient degree of crosslinking by curing.

In the composition having the interpenetrating polymer network structure according to one exemplary embodiment of the present invention, any one or two or more compounds selected from the group consisting of an isocyanate-based, a melamine-based, an amine-based, an acid anhydride-based, imidazole-based, and a mercaptan-based compounds may be used as the curing agent.

Herein, it is more preferred to react an isocyanate- and a melamine-based compounds subsequently as the curing agent. If two or more curing agents are simultaneously introduced to a crosslinking reaction, the structure of IPN may be varied depending on the reaction velocities of two or more curing agents, and thus, it is difficult to control the reaction to obtain a desired structure. Therefore, IPN of a uniform structure may be obtained by carrying out the reaction using one curing agent, and subsequently introducing another curing agent.

The isocyanate-based curing agent of the present invention may be any one or more selected from the group consisting of 2,4-trilene diisocyanate, 2,6-trilene diisocyanate, hydrogenated trilene diisocyanate, 1,3-xylene diisocyanate, 1,4-xylene diisocyanate, diphenyl methane-4,4-diisocyanate, 1,3-bisisocyanate methyl cyclohexane, tetramethyl xylene diisocyanate, 1,5-naphthalene diisocyanate, 2,2,4-trimethyl hexamethylene diisocyanate, 2,4,4-trimethyl hexamethylene diisocyanate, and triphenylmethane triisocyanate.

The melamine-based compound of the present invention may be any one or more selected from the group consisting of hexamethoxymethyl melamine, hexaethoxymethyl melamine, hexapropoxymethyl melamine, hexabutoxymethyl melamine, hexapentyloxymethyl melamine, and hexahexyloxymethyl melamine.

The polyol compound of the present invention may be any one or more selected from the group consisting of polyester polyol, polyether polyol, and polycarbonate polyol.

Herein, the polyol compound may be a low molecular weight polyol having a weight average molecular weight of 200 to 30,000. Outside of the above range, crosslinking by a curing reaction is not easy. If the polyol has an unduly low molecular weight, the polymer produced by the curing reaction may hardly have a molecular weight of 50,000 or more, and if the polyol has a molecular weight of 30,000 or more, it is difficult to generate effective penetration into polyalkylene carbonate molecules, and thus, it may be difficult to have an effective IPN structure after the curing reaction.

In one embodiment of the present invention, the isocyanate compound may be any one or two or more compounds selected from the group consisting of 2,4-trilene diisocyanate, 2,6-trilene diisocyanate, hydrogenated trilene diisocyanate, 1,3-xylene diisocyanate, 1,4-xylene diisocyanate, diphenyl methane-4,4-diisocyanate, 1,3-bisisocyanate methyl cyclohexane, tetramethyl xylene diisocyanate, 1,5-naphthalene diisocyanate, 2,2,4-trimethyl hexamethylene diisocyanate, 2,4,4-trimethyl hexamethylene diisocyanate, and triphenylmethane triisocyanate.

In one embodiment of the present invention, the curing agent may be any one or two or more compounds selected from the group consisting of an isocyanate-based, a melamine-based, an amine-based, an acid anhydride-based, imidazole-based, and a mercaptan-based compounds.

In one embodiment of the present invention, the epoxy compound may be any one or two or more compounds selected from the group consisting of a glycidyl ether-based, a glycidyl ester-based, a glycidyl amine-based, a linear aliphatic, and a cycloaliphatic compounds.

In one embodiment of the present invention, the acryl compound may be any one or two or more compounds selected from the group consisting of methyl acrylate, ethyl acrylate, propyl acrylate, butyl acrylate, heptyl acrylate, 2-ethyl hexyl acrylate, octyl acrylate, methyl methacrylate, ethyl methacrylate, decyl methacrylate, and 2-ethyl butyl methacrylate.

In one embodiment of the present invention, as the initiator or catalyst, any initiator or catalyst may used without limitation, if it is commonly used in the art. Specifically, for example, one or more selected from the group consisting of an organic tin compound such as tin octylate, monobutyltin triacetate, monobutyltin monooctylate, monobutyltin monoacetate, monobutyltin maleate, dibutyltin diacetate, dibutyltin dioctanoate, dibutyltin distearate, dibutyltin dilaurate and dibutyltin maleate, an organic titanium compound such as tetraisopropyl titanate and tetra-n-butyl titanate, and tert-amine such as triethylamine, N,N-diethylcyclohexylamine, N,N,N',N'-tetramethylethylenediamine and triethylenediamine, may be used.

The aliphatic polycarbonate-polyurethane polymer according to one exemplary embodiment of the present invention may have an interpenetrating polymer network structure by including an aliphatic polycarbonate, an epoxy compound selected from the group consisting of a glycidyl ether-based, a glycidyl ester-based, a glycidyl amine-based, a linear aliphatic and a cycloaliphatic compound, and a curing agent capable of being polymerized, crosslinked, or reacted with those compounds, wherein the epoxy compound may be a low molecular weight compound having a weight average molecular weight of 100 to 10,000, so that efficient penetration into the aliphatic polycarbonate molecules is generated, thereby forming an excellent IPN structure after a curing reaction.

The aliphatic polycarbonate-polyurethane polymer according to one exemplary embodiment of the present invention may have an interpenetrating polymer network structure by including an aliphatic polycarbonate, any one or more acryl compounds selected from the group consisting of alkyl acrylate or alkyl methacrylate such as methyl acrylate, ethyl acrylate, propyl acrylate, butyl acrylate, heptyl acrylate, 2-ethyl hexyl acrylate, octyl acrylate, methyl methacrylate, ethyl methacrylate, decyl methacrylate and 2-ethyl butyl methacrylate, and a curing agent capable of being polymerized, crosslinked or reacted with those compounds, wherein the epoxy compound may be a low molecular weight compound having a weight average molecular weight of 100 to 10,000, so that efficient penetration into the aliphatic polycarbonate molecules is generated, thereby forming an excellent IPN structure after a curing reaction.

It is preferred that polyalkylene carbonate resin composition having an interpenetrating polymer network structure by including the aliphatic polycarbonate, any one or more compounds selected from the group consisting of a polyol compound, an epoxy-based compound and an acryl-based compound, and a curing agent capable of being polymerized, crosslinked or reacted with those compounds has the interpenetrating polymer network structure by reactive extrusion, and the interpenetrating polymer network structure may be formed by a solution reaction, but not limited thereto.

The aliphatic polycarbonate-polyurethane polymer having the interpenetrating polymer network structure according to one exemplary embodiment of the present invention may further include any one or two or more additives selected from the group consisting of a pigment, a dye, a filler, an antioxidant, a sunscreen, an antistatic agent, an antiblocking agent, a slip agent, an inorganic filler, a kneading agent, a stabilizer, a tackifying resin, a modifying resin, a leveling agent, an optical brightener, a dispersant, a heat stabilizer, a light stabilizer, a UV absorbent and a lubricant.

The aliphatic polycarbonate-polyurethane composition according to the present invention, and the aliphatic polycarbonate-polyurethane polymer prepared using the composition, are applicable to various industry fields.

More specifically, the aliphatic polycarbonate-polyurethane composition according to one exemplary embodiment of the present invention may be used to manufacture a molded article by a method such as extrusion, injection, casting, and the like, and may be selected to be used according to the kind of the molded article to be manufactured.

The molded article manufactured by using the aliphatic polycarbonate-polyurethane composition according to one exemplary embodiment of the present invention may include artificial leather, a film, expandable foam, sheet, and the like, but not limited thereto.

Further, the aliphatic polycarbonate-polyurethane composition according to one exemplary embodiment may be used in various fields such as an ink composition, a paint composition, an adhesive composition, and the like.

Hereinafter, the present invention will be better understood by the following Examples, which are only provided to illustrate the present invention, but are not intended to limit the protection scope of the present invention.

Example 1

Based on 100 parts by weight of polycarbonate diol having a weight average molecular weight of 2,000 g/mol (G3452, Asahi Kasei), 23 parts by weight of 4,4-diphenyl methane diisocyanate (MDI) and 0.1 part by weight of dibutyltin dilaurate (DBTDL) were placed in a reactor, and reacted for 1 hour while being stirred at 60 rpm at 120° C. using a Brabender mixer, thereby obtaining an urethane prepolymer. To the urethane prepolymer 1,4-butanediol (BD) was added, and the reaction was allowed to proceed for 5 minutes while stirring at 60 rpm at 190° C., thereby obtaining a polyurethane resin. Herein, isocyanate index (NCO index, an equivalence ratio between isocyanate and diol) was 1.2, and a mole ratio of polyol, methylene diphenyl isocyanate (MDI), and 1,4-butanediol (BD) was 1.3:4.8:2.7. The polyurethane and polypropylene carbonate having a weight average molecular weight of 30,000 g/mol (SK Innovation) were blended in a weight ratio of 70:30 to prepare a polypropylene carbonate-polyurethane composition.

Example 2

Based on 100 parts by weight of polycarbonate diol having a weight average molecular weight of 2,000 g/mol (G3452, Asahi Kasei), 23 parts by weight of 4,4-diphenyl methane diisocyanate (MDI) and 0.1 part by weight of dibutyltin dilaurate (DBTDL) were placed in a reactor, and reacted for 1 hour while being stirred at 60 rpm at 120° C. using a Brabender mixer, thereby obtaining an urethane prepolymer. 70 parts by weight of the urethane prepolymer, 30 parts by weight of polypropylene carbonate having a weight average molecular weight of 30,000 g/mol (SK Innovation), and 50 parts by weight of 1,4-butanediol (BD) were placed in the reactor. Herein, isocyanate index (NCO index, an equivalence ratio between isocyanate and diol) was 1.2, and a mole ratio of polyol, methylene diphenyl isocyanate (MDI), and 1,4-butanediol (BD) was 1.3:4.8:2.7.

The reaction mixture was reacted for 5 minutes while being stirred at 60 rpm at 190° C., thereby preparing a hybrid polymerized polypropylene carbonate-polyurethane copolymer.

Comparative Example 1

Based on 100 parts by weight of polycarbonate diol having a weight average molecular weight of 2,000 g/mol (G3452, Asahi Kasei), 23 parts by weight of 4,4-diphenyl methane diisocyanate (MDI), and 0.1 part by weight of dibutyltin dilaurate (DBTDL) were placed in a reactor, and reacted for 1 hour while being stirred at 60 rpm at 120° C. using a Brabender mixer, thereby obtaining an urethane prepolymer. To the urethane prepolymer 1,4-butanediol (BD) was added, and the reaction was allowed to proceed for 5 minutes while stirring at 60 rpm at 190° C., thereby obtaining a polyurethane resin.

(Evaluation)

The products prepared in the above Examples and Comparative Example were coated on a PET film, and then the film was dried, thereby preparing a specimen having the thickness as shown in Table 1 below. Each physical property of the specimen was measured by the method according to the ASTM standard. Herein, the measurement was carried out separately in MD and TD directions. Further, adhesion and hydrolysis resistance were evaluated by the following methods:

(1) Adhesion

After the prepared specimen was pressed at a pressure of 50 bar for 30 seconds under the temperature condition as shown in Table 2 below, and then cooled at room temperature for 5 seconds, maximum adhesion of the specimen was measured under the condition of 180° C. and 200 mm/min using a peel tester.

(2) Hydrolysis Resistance

After the specimen was hung on a water bath and placed in an oven at 60° C. for 5 days, a rate of change was measured by comparing the tensile strengths before and after testing.

TABLE 1

| Classification | Unit | Example 1 MD | Example 1 TD | Example 2 MD | Example 2 TD | Comparative Example 1 MD | Comparative Example 1 TD | Test standard |
|---|---|---|---|---|---|---|---|---|
| Thickness after drying | mm | 0.179 | 0.194 | 0.156 | 0.187 | 0.107 | 0.164 | ASTM D792 |
| Specific gravity | g/cm³ | 1.22 | | 1.24 | | — | | ASTM D2240 |
| Hardness | shore A | 80 | | 75 | | — | | ASTM D412 |
| Tensile strength | kgf/cm² | 803 | 608 | 850 | 623 | 711 | 553 | ASTM D412 |
| Elongation | % | 404 | 505 | 479 | 520 | 363 | 418 | ASTM D624 |
| Tear strength | kgf/cm | 128 | 149 | 128 | 149 | 142 | 117 | ASTM D1238 |
| Melt index | g/10 min | 5.4 | | 5.0 | | — | | 150° C./5 kg |

TABLE 2

| Classification | Example 1 MD | Example 1 TD | Example 2 MD | Example 2 TD | Comparative Example 1 MD | Comparative Example 1 TD |
|---|---|---|---|---|---|---|
| Adhesion test setting temperature (° C.) | 130 | 160 | 130 | 160 | 130 | 160 |
| Maximum adhesion (N/cm) | 72.50 | 77.64 | 83.90 | 85.75 | 69.24 | 62.20 |
| Rate of change of tensile strength (%) | 9.4 | 19.9 | −4.7 | −24.8 | −67.1 | −38.1 |
| Rate of change of elongation (%) | 13.8 | 26.6 | 23.5 | 4.8 | −28.7 | −32.7 |

As seen from the Tables 1 and 2 above, Examples 1 and 2 according to the present invention represented excellent mechanical physical properties of tensile strength, elongation, tear strength, and hardness; had low rates of change of tensile strength and elongation while implementing such excellent mechanical physical properties, thereby improving hydrolysis resistance; and showed excellent adhesion having maximum of 87.75 (N/cm). On the contrary, it was confirmed that Comparative Example 1 used polyurethane alone which was not blended or hybrid polymerized with polyalkylene carbonate according to the present invention, thereby having significantly inferior mechanical physical properties, hydrolysis resistance, and adhesion to those of the Examples.

The aliphatic polycarbonate-polyurethane polymer according to the present invention has an effect of excellent durability such as flex resistance, hydrolysis resistance, printability, and the like, as compared with aliphatic polycarbonate alone.

Further, the aliphatic polycarbonate-polyurethane composition according to the present invention may be used as environmentally friendly polyurethane by containing the aliphatic polycarbonate.

Though the preferred Examples of the present invention has been described in detail, as above, any person skilled in the art will make various modifications of the invention without departing from the spirit and the scope of the present invention as defined in the claims. Therefore, the present invention is not limited to the above Examples.

What is claimed is:

1. A polymer composition comprising:
   a crosslinked aliphatic polycarbonate having a weight average molecular weight of 30,000 to 250,000 g/mol and produced by reacting carbon dioxide with one or more epoxide compounds; and a polyurethane penetrated into the crosslinked aliphatic polycarbonate to form an interpenetrating polymer network structure.

2. The polymer composition of claim 1, wherein the aliphatic polycarbonate is polypropylene carbonate or polyethylene carbonate.

3. The polymer composition of claim 1, further comprising any one selected from the group consisting of an epoxy compound and an acryl compound, or a mixture thereof.

4. The polymer composition of claim 3, wherein
the epoxy compound is at least one selected from the group consisting of a glycidyl ether-based, a glycidyl ester-based, a glycidyl amine-based, a linear aliphatic, and cycloaliphatic compounds, and
the acryl compound is at least one selected from the group consisting of methyl acrylate, ethyl acrylate, propyl acrylate, butyl acrylate, heptyl acrylate, 2-ethyl hexyl acrylate, octyl acrylate, methyl methacrylate, ethyl methacrylate, decyl methacrylate, and 2-ethyl butyl methacrylate.

5. A molded article using the polymer composition of claim 1.

6. The molded article of claim 5, wherein it is selected from the group consisting of artificial leather, a film, expandable foam and sheet.

7. A method of producing a polymer composition, the method comprising:
reacting a polycarbonate polyol having a weight average molecular weight of 200 to 30,000 g/mol with an isocyanate compound to form a urethane prepolymer;
mixing the urethane prepolymer with an aliphatic polycarbonate having a weight average molecular weight of 30,000 to 250,000 g/mol and a curing agent to form a mixture; and
curing the mixture to form a polymer composition having an interpenetrating polymer network (IPN) structure in which a polyurethane derived from the urethane prepolymer is penetrated into a crosslinked aliphatic polycarbonate derived from the aliphatic polycarbonate.

8. The method of claim 7, wherein the aliphatic polycarbonate is produced by reacting carbon dioxide with one or more epoxide compounds.

9. The method of claim 8, wherein the isocyanate compound is at least one selected from the group consisting of 2,4-trilene diisocyanate, 2,6-trilene diisocyanate, hydrogenated trilene diisocyanate, 1,3-xylene diisocyanate, 1,4-xylene diisocyanate, diphenyl methane-4,4-diisocyanate, 1,3-bisisocyanate methyl cyclohexane, tetramethyl xylene diisocyanate, 1,5-naphthalene diisocyanate, 2,2,4-trimethyl hexamethylene diisocyanate, 2,4,4-trimethyl hexamethylene diisocyanate, and triphenylmethane triisocyanate.

10. The method of claim 7, wherein the curing agent is at least one selected from the group consisting of an isocyanate-based, a melamine-based, an amine-based, an acid anhydride-based, an imidazole-based, and a mercaptan-based compound.

11. The method of claim 8, wherein the epoxide compounds are selected from the group consisting of (C2-C20) alkylene oxide and (C8-C20)styrene oxide.

12. The method of claim 11, wherein the epoxide is substituted with halogen, (C1-C20)alkyloxy, (C6-C20)aryloxy, or (C6-C20)aryl(C1-C20)alkyl(aralkyl)oxy.

* * * * *